United States Patent [19]
Wingler et al.

[11] Patent Number: 4,795,780
[45] Date of Patent: Jan. 3, 1989

[54] PROCESS FOR THE PREPARATION OF BINARY α-METHYLSTYRENE/ACRYLONITRILE RESINS BY MULTI-STAGE BULK POLYMERIZATION

[75] Inventors: Frank Wingler, Leverkusen; Klaus Sümmermann, Cologne; Gerd Wassmuth, Leverkusen; Alfred Pischtschan, Kuerten; Joachim Döring, Langenfeld, all of Fed. Rep. of Germany

[73] Assignee: Bayer Aktiengesellschaft, Leverkusen, Fed. Rep. of Germany

[21] Appl. No.: 75,775

[22] Filed: Jul. 20, 1987

[30] Foreign Application Priority Data

Aug. 2, 1986 [DE] Fed. Rep. of Germany ....... 3626319

[51] Int. Cl.$^4$ .................. C08F 2/02; C08F 220/44
[52] U.S. Cl. ............................ 525/53; 525/54; 525/70; 525/242; 526/65; 526/68; 526/88; 526/89; 526/208; 526/342; 522/3; 522/188
[58] Field of Search ............ 525/54, 243, 53, 70, 525/242; 526/65, 68, 342, 88, 89, 208, 522/3, 188

[56] References Cited

U.S. PATENT DOCUMENTS

| | | | |
|---|---|---|---|
| 4,002,812 | 1/1977 | Hendy | 526/59 |
| 4,068,064 | 1/1978 | Platt et al. | 526/342 X |
| 4,141,934 | 2/1979 | Wingler et al. | 526/342 X |
| 4,618,663 | 10/1986 | Nakagawa | 526/342 X |

Primary Examiner—Joseph L. Schofer
Assistant Examiner—F. M. Teskin
Attorney, Agent, or Firm—Connolly & Hutz

[57] ABSTRACT

Process for the preparation of thermoplastic copolymers of α-methylstyrene and acrylonitrile by continuous bulk copolymerization of A. 30 to 50 mol % of α-methylstyrene and
B. 70 to 50 mol % of acrylonitrile at temperatures from 60° to 120° C. with average residence times of 4 to 12 hours in the presence of initiators which supply free radicals, carried out in at least two continuously operated mixed tank reactors, characterized in that 100 molar parts of a monomer mixture of $A_0$. 34 to 52 mol % of α-methylstyrene and
$B_0$. 66 to 48 mol % of acrylonitrile are fed continuously into the first tank reactor per unit time, and, with back-mixing, are copolymerized up to a conversion of 5 to 30 molar parts to give a copolymer of the composition $A_1$. 49 to 53 mol % of α-methylstyrene and
$B_1$. 51 to 47 mol % of acrylonitrile, and the mixture consisting of 70 to 95 molar parts of the monomers A and B and 5 to 30 molar parts of the copolymer of the composition $A_1$-$B_1$ is transferred continuously to the second tank reactor and is polymerized there up at a further conversion of 5 to 55 molar parts to a total conversion of 20 to 60 molar parts to give further copolymer of the composition $A_1$. 49 to 53 mol % of α-methylstyrene and
$B_1$. 51 to 47 mol % of acrylonitrile, 0,5 to 11.5 molar parts of acrylonitrile being removed from the vapor condenser of the second tank reactor and recycled to the first tank reactor per unit time.

3 Claims, No Drawings

PROCESS FOR THE PREPARATION OF BINARY α-METHYLSTYRENE/ACRYLONITRILE RESINS BY MULTI-STAGE BULK POLYMERIZATION

The invention relates to a process for the preparation of thermoplastic α-methylstyrene/acrylonitrile copolymers by continuous bulk polymerization of α-methylstyrene and acrylonitrile in the presence of initiators which supply free radicals and start the polymerization, carried out in at least two continuously operated mixed tank reactors connected in series, a certain molar proportion of acrylonitrile per unit time being removed from the vapour condenser of the second continuously operated tank reactor and recycled to the first continuously operated tank reactor, and to the copolymers prepared by the process. Copolymers which have a high molecular and chemical uniformity and produce moulding compositions of high heat distortion temperature and impact strength when mixed with graft rubber are obtained in this process at little technical effort.

Copolymers of α-methylstyrene and acrylonitrile are known, c. f. European Patent No. 0,107,795; and Makromolekulare Chemie 103 (1967) 188.

Continuous bulk polymerization of α-methylstyrene and acrylonitrile in the presence of monomer-soluble initiators which dissociate to yield free radicals is likewise known. Thus, inter alia, Auslegeschrift No. 2,809,180 describes a process for the preparation of copolymers with preferably 68 to 72% by weight of α-methylstyrene (the remainder being acrylonitrile), corresponding to a molar composition of 48.9 to 53.6 mol % of α-methylstyrene and 51.1 to 46.4 mol % of acrylonitrile, with a high relative space/time yield in the presence of azo initiators with a half-life of less than 30 minutes.

German Auslegeschrift No. 2,809,180 contains no information on the absolute average residence time of the continuous polymerization. Only relative space/time yields, based on experiment 1, page 4, are given. Reproducing experiment 3, page 4, showed, that at a polymerization temperature of 105° C. with the addition of 0.15% by weight of azodiisobutyrodinitrile to a mixture consisting of 31.3% by weight of acrylonitrile and 63.8% by weight of α-methylstyrene together with 4.75% by weight of ethylbenzene in only one stirred tank reactor with continuous flow, an average residence time of 6 to 8 hours is necessary to achieve a conversion of 50 to 60% by weight. The intrinsic viscosity of the polymer freed from monomers and solvent in a devolatilization extruder is 40 to 45 ml/g, measured at 25° C. in dimethylformamide; α-methylstyrene/acrylonitrile copolymers with intrinsic viscosities of less than 50 ml/g yield, however, thermoplastic moulding compositions of inadequate notched impact strength when mixed with graft rubbers.

German Patent No. 2,540,517 describes a process for the preparation of chemically uniform bulk copolymers of monomers of different reactivity by at least one two-stage polymerization reaction in a mixed tank reactor and a polymerization kneader of particular construction connected in series, monomers being metered into the second process stage in a controlled manner.

Patent No. 150,617 of the German Democratic Republic also describes a multi-stage preparation process according to the principle of bulk polymerization in a cascade of stirred kettles with intermediate feeding in of monomers, for example the copolymerization of styrene with acrylonitrile at 60° C. in the presence of azodiisobutyrodinitrile to form products of narrow molecular weight distribution.

German Offenlegungsschrift No. 2,411,180 also describes a multi-stage process for the continuous block (bulk) polymerization of polyalkenyl-aromatic monomers, condensed liquid monomers from the second reactor being recycled to the first reaction zone. Only the polymerization of vinylaromatics and mixtures thereof, such as styrene and α-methylstyrene, is described in the working examples, there being no data, however, on the amounts for a binary α-methylstyrene/acrylonitrile copolymerization.

It has now been found that very long residence times are also required for the copolymerization of α-methylstyrene and acrylonitrile when azodiisobutyrodinitrile is used as the initiator which triggers off polymerization, and the absolute space/time yields are accordingly low. With long residence times, oligomers of the tetralin type are also formed, and these impair the heat distortion temperature of the copolymers.

Since polymerization processes in reactors connected in series with intermediates feeding in of monomers are also unsatisfactory, it was surprising that polymerization in at least two stirred tank reactors connected in series (mixed, continuously operated tank reactors), a certain molar amount of acrylonitrile being removed from the vapour condenser of the second stirred kettle and recycled to the first stirred kettle per unit time, gives improved copolymers in a shorter residence time.

The invention relates to a process for the preparation of thermoplastic copolymers of α-methylstyrene and acrylonitrile by continuous bulk copolymerization of A. 30 to 50 mol % of α-methylstyrene and
B. 70 to 50 mol % of acrylonitrile at temperatures of 60° to 130° C. with average residence times of 4 to 12 hours in the presence of initiators which supply free radicals, carried out in at least two continuously operated mixed tank reactors arranged in series, the second tank reactor being provided with a vapour condenser, which process comprises feeding 100 molar parts of a monomer mixture of $A_o$ 34 to 52 mol % of α-methylstyrene and
$B_o$. 66 to 48 mol % of acrylonitrile continuously into the first tank reactor per unit of time and, with back-mixing, copolymerizing up to a conversion of 5 to 30 molar parts to form a copolymer of the composition $A_1$. 49 to 53 mol % of α-methylstyrene and
$B_1$. 51 to 47 mol % of acrylonitrile, and transferring the mixture consisting of 70 to 95 molar parts of the monomers A and B and 5 to 30 molar parts of the copolymer of the composition $A_1$-$B_1$ continuously to the second tank reactor and polymerizing there another 5 to 55 molar parts up to a total conversion of 20 to 60 molar parts to yield additional copolymer of the composition $A_1$. 49 to 53 mol % of α-methylstyrene and
$B_1$. 51 to 47 mol % of acrylonitrile, removing 0,5 to 11,5 molar parts of acrylonitrile from the vapour condenser of the second tank reactor per unit of time and recycling to the first tank reactor.

The invention also relates to the copolymers of $A_1$. 49 to 53 mol % of α-methylstyrene and
$B_1$. 51 to 47 mol % of acrylonitrile obtainable by this process.

Molar parts is understood as the molar amount, expressed in grams (g), multiplied by any desired factor.

The polymerization of α-methylstyrene and acrylonitrile is carried out continuously in a homogeneous phase system. For this, the monomers and any auxiliaries are introduced continuously into a reactor at a constant feed rate and reaction product is removed at the same rate, so that constant filling level is established in the reactor with respect to time. "Homogeneous" means that the system is a one-phase system. The polymer formed is homogeneously soluble in the residual monomer mixture. The monomers are also homogeneously soluble in the reaction mixture. The unreacted monomers act as solvents for the polymer formed in the homogeneous bulk polymerization.

It is frequently advisable to add a small amount of solvent, for example 2 to 30% by weight of methyl ethyl ketone or ethylbenzene, in the bulk polymerization.

These additives which reduce the viscosity are removed, together with the unreacted monomers, after the polymerization. The content of α-methylstyrene in the starting monomer mixture $A_oB_o$ of 34 to 52 mol % is critical. At a content of more than 52 mol % of α-methylstyrene, the molecular weight of the polymer formed drops rapidly as the content increases, and this can be seen by a drop in the intrinsic viscosity to below 50 ml/g, measured at 25° C. in dimethylformamide (DMF). This manifests itself in a poorer mechanical strength of mixtures of copolymers prepared according to the invention with graft rubbers.

Polymerization is carried out at 60° to 120° C., preferably 80° to 110° C., with an average residence time of 4 to 12 hours, preferably 4 to 6 hours. The steady-state conversion over the two polymerization stages is 20 to 60 mol %, preferably 30 to 50 mol %, and the absolute space/time yields are about 0.5 to 1.5

$$\frac{\text{mol}}{\text{liter} \times \text{hour}}$$

The combination of a polymerization temperature of 80° to 110° C. with a residence time of 4 to 6 hours and the steady-state conversion of 30 to 50 mol % is preferred for obtaining particularly advantageous industrially useful α-methylstyrene/acrylonitrile copolymers. A polymerization temperature above 120° C., a steady-state conversion of more than 60 mol % and an average residence time of less than 4 hours give copolymers with low molecular weights and their mixtures with graft rubbers have a low mechanical strength.

The polymerization is carried out by also using initiators which start free radical chain polymerization reactions. These can be azo compounds, peroxides, light and high-energy radiation.

Initiators which dissociate into free radicals under the influence of heat, for example azo compounds, peroxides or sterically hindered hydrocarbons, should have a disintegration time half-life of less than 60 minutes at the maximum polymerization temperature of 120° C. in order to avoid accumulation of undissociated portions of initiator in the reaction material, since these can start an undesired after-polymerization during working up or may cause the polymerization to run away in the event of small disturbances.

Examples of possible initiators are: tert.-butyl peroctoate, benzoyl peroxide, dilauroyl peroxide, tert.-butyl perpivalate, azo-bis(isobutyronitrile), di-tert.-butyl-peroxy-3,3,5-trimethylcyclohexane, di-tert.-butyl-peroxy hexahydroterephthalate, 2,5-dimethylhexane 2,5-diperbenzoate, t-butyl per-2-ethylhexanoate, azo-bis(2,4-dimethylvaleronitrile), 2,5-dimethyl-2,5-di-(tert.-butylperoxide)-hexane, dioctanoyl peroxide, t-butyl perneodecanoate and diisopropyl peroxydicarbonate.

The polymerization can also be started by light and photoinitiators, as described, for example, in German Offenlegungsschrift No. 2,523,507 and German Offenlegungsschrift No. 2,600,318.

Photoinitiators are organic and inorganic compounds which dissociate into free radicals in the presence of UV or visible light. Such initiators are described by H. J. Hageman in Progress in Org. Coatings 13 (1985), pages 123–150. The initiators which dissociate into free radicals and start free radical chain polymerization are employed in amounts of 0.01 to about 0.5% by weight, preferably 0.02 to 0.2% by weight, based on the monomer mixture.

The initiators can be employed in the first tank reactor or also in the first and in the second tank reactor.

The homogeneous polymerization can also be carried out in the presence of additives which reduce the viscosity, such as methyl ethyl ketone, ethylbenzene, toluene, tert.-butanol and the like, in amounts of 2 to 30% by weight, based on the monomers. This addition, which is customary with bulk polymerization reactions, should be also used only to the extent that it does not slow down the polymerization too much.

The continuous bulk polymerization is carried out in at least two mixed tank reactors in series. The tank reactors have mixing elements, such as stirrers and/or also a loop. In loop reactors, some of the reaction product is removed at the bottom and fed in again at the top for better mixing. In this context, see DE-OS (German Published Specification) No. 2,343,871. The polymerization in the second tank reactor is advantageously carried out with vapour condensation. Methods for the vapour condensation of polymerization processes are described by E. Heil, A. Smits, Chem. Ing. Techn. 46 (1974), Volume 5, page 217 and in German Auslegesschrift No. 1,495,145 as well as German Offenlegungsschriften Nos. 2,504,659, 3,334,33,8, 3,237,076 and 3,430,247. Ascending or descending reflux condensers or descending side arm condensers prove to be particularly advantageous. Since acrylonitrile has a higher vapour pressure than α-methylstyrene, acrylonitrile concentrates in the vapour and thus in the condensate from the condenser. According to the invention, a certain molar content of acrylonitrile is removed from the condenser of the second tank reactor and fed into the first per unit time. The removal should be 0,5 to 11,5 preferably 2.5 to 9 molar parts of acrylonitrile per unit time, based on 100 molar parts of starting monomer $A_oB_o$.

Removal of a small amount of α-methylstyrene from the second polymerization stage is unavoidable here, but this has no adverse influence on the polymerization.

By recycling acrylonitrile from the second stage to the first stage, a higher acrylonitrile content B than that corresponding to the starting mixture $A_oB_o$ is established in the first stage. The fact that with the monomer composition AB claimed α-methylstyrene is incorporated into the polymer $A_1B_1$ in preference to acrylonitrile is to be attributed to the further enrichment of acrylonitrile in the first reactor. The monomer mixture AB which leads to the polymer $A_1B_1$ is therefore richer in acrylonitrile than the starting mixture $A_oB_o$. The desired product $A_1B_1$ with the advantageous properties is only obtained in the narrow composition range described by recycling acrylonitrile to the extent described.

The resins according to the invention are distinguished by a high chemical and molecular homogeneity. The heterogeneity index U=0.7 to 1.4, calculated according to $$U = \frac{\overline{M}_w}{\overline{M}_n} - 1$$

($\overline{M}_w$=weight average of the monomer weight; $\overline{M}_n$=number average of the molecular weight.

The heat distortion temperature of the pure resins are in the range of 118° to 125° C., measured by the Vicat B method, and the content of oligomers of the tetralin type is less than 1.5%, preferably less than 1%.

These copolymers can be used as matrix resins for the preparation of high impact moulding compositions with improved dimensional stability under heat. The copolymers are usually mixed with a graft rubber in the melt in kneaders or internal mixers or on mills or extruders.

Suitable graft rubbers are known. They can be obtained by graft-polymerization of styrene and, if appropriate, α-methylstyrene with acrylonitrile in the presence of a rubber substrate, also called the graft substrate. During grafting, not all of the monomer is grafted onto the substrate, but some of the monomer is polymerized to free resin. Such graft polymers can be prepared in known manner by free radical polymerization of the monomers in the presence of rubber in bulk, emulsion, suspension or solution and by combined processes, such as bulk/suspension polymerization or solution/precipitation polymerization.

Natural and synthetic rubbers are used as the graft substrate. Suitable synthetic rubbers are homo- and copolymers of optionally halogen-substituted conjugated dienes with 4 to 8 carbon atoms, such as butadiene, isoprene, chloroprene and copolymers thereof with styrene and/or acrylonitrile. The copolymers can be random or in block form. Products in block form can be two-block polymers of the AB type or three-block polymers of the ABA type, as well as star-shaped block polymers, for example of the formula $(ABA)_xY$, wherein, for example A represents polystyrene, B represents polybutadiene and Y represents a polyfunctional coupling reagent, such as, for example, $SiCl_4$, $S_2Cl_2$, divinylbenzene, epoxidized fatty acids and the like; x is of the order of 2 to 5. In the polybutadines 85% of the double bonds or more can be 1.4-linkages (which are in the polymer chain) and 95% or more of these can be cis-configurated; the content of 1,2-vinyl double bonds can be up to 15%, based on the total of the double bonds. Styrene/butadiene block copolymers with a styrene content of 5 to 45% by weight are also suitable. Another class of synthetic rubbers consists of ethylene/propylene co- and ter-polymers. They contain 70 to 30 parts by weight of ethylene to 30 to 70 parts by weight of propylene. Terpolymers with 4 to 15% by weight of, for example 5-ethylidenenorbornene, dicyclopentadiene, hexa-1,4-diene or 2,2,1-bicycloheptadiene with about 1 to 20 C=C double bonds per 1,000 atoms are advantageous. Graft polymers based on these elastomers, which are also called EPDM or APTK rubbers, are distinguished by a particularly good resistance to weathering. The graft bases which are resistant to weathering also include ethylene/vinyl acetate copolymers (EVA) and acrylate elastomers. The EVA elastomers contain 30 to 85% of copolymerized vinyl acetate and can be esterified in the side positions with unsaturated carboxylic acids, for example acrylic or methacrylic acid, to give better grafting properties.

The EVA copolymers can also be partly hydrolysed, with OH numbers of 1 to about 100 mg of KOH/g of substance. The acrylate rubbers are usually copolymers of $C_2$-$C_8$-alkyl esters of acrylic acid, such as, for example, ethyl, n- or iso-propyl, n-butyl, iso-butyl, tert.-butyl or 2-ethylhexyl acrylate. Other comonomers are, inter alia, acrylonitrile, methacrylates with 1 to 14 C atoms in the ester part, butadiene and vinyl alkyl ethers with 1 to 18 C atoms in the ether part.

The high impact strength moulding compositions prepared from the resins and graft rubbers according to the invention have a heat distortion temperature of at least 108° C., preferably of 110° to 120° C., measured by the Vicat B method, with rubber contents of ≦25 parts by weight/100 parts by weight of blend. Compared with ABS moulding compositions based on α-methylstyrene/acrylonitrile copolymers which are obtained by emulsion polymerization with the same α-methylstyrene content, their heat distortion temperature in practice is 2° to 6° C. higher. The moulding compositions prepared with the resins according to the invention also have a lighter crude colour shade, better flowability during processing and a lower tendency to discolour when exposed to heat. Molded articles are distinguished by an outstanding surface quality and low stress conditions coupled with a high impact strength.

Customary stabilizers, light stabilizers, anti-ageing agents, flow control and processing auxiliaries, fillers, mineral and inorganic fibre and reinforcing fillers, such as glass fibres, carbon fibres, metal whiskers, polyester, polyamide and polyaramide fibres and the like, pigments and the like can be added to the high impact moulding compositions. The moulding compositions according to the invention are particularly advantageous in cases where a good resistance to weathering, a high heat distortion point, high strength and easy processability are important. They can therefore be advantageously used, for example, for the production of pipelines, high quality seals, cutlery, equipment which can be sterilized with hot steam, washing machine components, battery cases, dry battery housings, housings and other insulating components in electrically operated machines, electrical insulating films, vessel linings which are stable towards hydrolysis, filter cloths which are chemically and thermally resistant and many other items. Preferred fields of use are the construction of vehicle components, automobile, motor cycle, aeroplane and railway construction, and the production of injection-moulded components of complicated shape which are required to have a high heat distortion point, such as, for example, radiator grills, mudguard inserts, internal linings, dashboards, supporting straps, car roofs, coverings and housings for domestic appliances and office machines.

EXAMPLE

A flooded stainless steel reactor with a filling capacity of 5.8 liters, a double-walled jacket which can be heated, an anchor-type stirrer and internal temperature measurement is used as the reaction vessel for the first polymerization stage. For better mixing, the polymer syrup is continuously pumped through a loop in circulation. The internal temperature is controlled via the wall temperature with heat transfer oil. 30.46 mol/hour (2.54 kg/hour) of monomer mixture of the composition $A_o=46.8$ mol % (66% by weight) of α-methylstyrene and $B_o=53.2$ mol % (34% by weight) of acrylonitrile with 0.035% by weight (based on the monomer mixture) of azobisisobutyronitrile as the initiator are continuously fed into the reactor from the bottom. A pressure of 2 bar is maintained in the reactor via the pressure control of the discharge pump. The oil jacket temperature is 105° C. and that of the polymerization material is 100° C. The reaction mixture, of which 14.4 mol % (15% by weight) has reacted, is removed from the tank reactor and transferred to the second polymerization stage at the same rate at which fresh starting material is pumped in.

The second polymerization stage consists of a stainless steel tank reactor with a total volume of 12 liters, a double-walled jacket which can be heated, an anchor stirrer, internal temperature measurement and a reflux condenser with a valve to remove distillate. For better mixing, polymer syrup is continuously removed at the bottom of the reactor and fed into the reactor again at the top of the reactor (loop). The temperature is controlled by measuring the internal temperature and controlling the vapour condensation via pressure regulation. The polymerization is continued in the second stage up to a conversion of 38.8 mol % (40% by weight) with the addition of 0.075% by weight (based on the monomer employed) of azobisisobutyronitrile. 1.14 mol/hour of acrylonitrile and 0.06 mol/hour of α-methylstyrene (Σ 67 g/hour) are removed continuously from the reflux condenser and recycled to the first polymerization stage. The polymerization temperature is 100° C., the oil jacket temperature is 115° C. and the filling volume is 9.5 liters.

The polymer syrup is then freed from the unreacted monomers in a devolatilization extruder. After working up, if appropriate, these monomers can be fed to the starting monomer mixture, taking account of the concentration. Analysis of the resin prepared is carried out on the granules or on injection-moulded articles.

The properties were determined by the following methods:

Impact strength $a_n$: in accordance with DIN 53453,
notched impact strength $a_k$: in accordance with DIN 53453,
yield stress $\sigma_s$: in accordance with DIN 53455,
yield elongation $\epsilon_s$: in accordance with DIN 53455,
ball indentation hardness H 30: in accordance with DIN 53456,
melt index MFI: in accordance with DIN 53735
and Vicat softening point VST/B120: in accordance with DIN 53460.

Properties of the resin thus prepared:

Molecular heterogeneity: $M_w/M_n$-1:0.9
Intrinsic viscosity: 54 ml/g, measured at 25° C. in DMF
H 30: 163N/mm$^2$
Vicat: 120° C.

Preparation of the mixtures 25 parts of graft rubber, prepared by grafting 50 parts of styrene and acrylonitrile in a ratio of 72/28 onto 50 parts of a polybutadiene polymerized in emulsion, the particle diameter being between 0.1 and 0.4 μm, are mixed with 75 parts of resin with the addition of 2 parts of lubricant and the mixture is compounded in an internal kneader. The test specimens are injection-moulded at 240° C.

Properties of the compound:
$a_k$ (RT) 10.4 KJ/m$^2$
$a_k$ (−40° C.) 5.2 KJ/m$^2$
$\sigma_s$ 54.8N/mm$^2$
$\epsilon_s$ 3.1%
H 30 118N/mm$^2$
Vicat: 116° C.
MFI 220/10:3.5 g/10

We claim:

1. A process for the production of a thermoplastic copolymer of α-methylstyrene and acrylonitrile by continuous bulk copolymerization at a polymerization temperature of 60° to 130° C. with a residence time of 4 to 12 hours in the presence of an initiator which supplies free radicals carried out in at least two continuously operated mixed tank reactors, the second tank reactor being equipped with a vapor condenser, in which 100 molar parts of 34 to 52 mol % of α-methylstyrene and 66 to 48 mol % of acrylonitrile are fed continuously into the first tank reactor per unit time and, with back-mixing, are copolymerized up to a conversion of 5 to 30 molar parts to give a copolymer of the composition 49 to 53 mol % of α-methylstyrene and 51 to 47 mol % of acrylonitrile, and the resulting mixture of the copolymer and the unreacted α-methylstyrene and acrylonitrile monomers is transferred continuously to the second tank reactor and is polymerized there an additional 5–50 molar parts resulting in a total conversion of 20 to 60 molar parts to give further copolymer of the composition 49 to 53 mol % of α-methylstyrene and 51 to 47 mol % of acrylonitrile, 0.5 to 11.5 molar parts of acrylonitrile being removed from the vapor condenser of the second tank reactor and recycled to the first tank reactor per unit time.

2. A process according to claim 1, in which the polymerization is carried out in the presence of 2 to 30% by weight of methyl ethyl ketone or ethylbenzene.

3. A process according to claim 1 in which the polymerization temperature is 80° to 110° C., the residence time is 4 to 6 hours and the polymerization is carried out with a steady-state conversion of 30 to 50 mol %.

* * * * *